(12) United States Patent
Joseph et al.

(10) Patent No.: US 12,301,783 B2
(45) Date of Patent: May 13, 2025

(54) SECURITY CAMERA WITH SELF-CALIBRATION OF PAN AND/OR TILT OPERATIONS

(71) Applicant: Honeywell International Inc., Charlotte, NC (US)

(72) Inventors: Jeslin Paul Joseph, Bengaluru (IN); Abhisekh Jain, Madurai (IN); Sivasanthanam Dhayalan, Bangalore (IN); Kingslin Joseph, Karnataka (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 70 days.

(21) Appl. No.: 18/115,440

(22) Filed: Feb. 28, 2023

(65) Prior Publication Data
US 2024/0291958 A1    Aug. 29, 2024

(51) Int. Cl.
*H04N 17/00*   (2006.01)
*H04N 23/68*   (2023.01)
*H04N 23/695*  (2023.01)

(52) U.S. Cl.
CPC ....... *H04N 17/002* (2013.01); *H04N 23/6812* (2023.01); *H04N 23/695* (2023.01)

(58) Field of Classification Search
CPC ..... H04N 23/45; H04N 23/667; H04N 23/662
USPC ......................................................... 348/155
See application file for complete search history.

(56) References Cited

U.S. PATENT DOCUMENTS

| 6,965,397 B1 | 11/2005 | Honey et al. |
| 9,088,698 B2 | 7/2015 | Lee et al. |
| 10,663,298 B2 | 5/2020 | Ali et al. |
| 2007/0116458 A1 | 5/2007 | McCormack |
| 2008/0094480 A1 | 4/2008 | Swarr |

(Continued)

FOREIGN PATENT DOCUMENTS

| CN | 106525074 B | * 11/2019 | ........... G01C 25/005 |
| CN | 110782496 A | * 2/2020 | ............... G06T 7/80 |

(Continued)

OTHER PUBLICATIONS

Extended European Search Report, EP Application No. 24155806.3, European Patent Office, Jun. 20, 2024 (9 pages).

(Continued)

*Primary Examiner* — Behrooz M Senfi
(74) *Attorney, Agent, or Firm* — Seager, Tufte & Wickhem, LLP (57) ABSTRACT

A security camera includes an image capture sensor and one or more motors for achieving a pan and/or tilt operation of the image capture sensor. A gyroscope sensor senses angular speed of the image capture sensor. A memory stores calibration data that includes an indication of the angular speed of the image capture sensor sensed by the gyroscope sensor while performing a pan and/or tilt operation of the image capture sensor. A controller is configured to subsequently compare the angular speed of the image capture sensor while performing a pan and/or tilt operation of the image capture sensor with the calibration data to identify a drift in the angular speed of the image capture sensor while performing a pan and/or tilt operation of the image capture sensor over time. The controller is configured to compensate for the drift during subsequent pan and/or tilt operations.

14 Claims, 10 Drawing Sheets

(56) References Cited

U.S. PATENT DOCUMENTS

| | | | | |
|---|---|---|---|---|
| 2010/0033567 A1* | 2/2010 | Gupta | ......... | H04N 17/002 |
| | | | | 348/E17.001 |
| 2017/0264827 A1 | 9/2017 | Dao | | |
| 2023/0262301 A1* | 8/2023 | Thomas, Jr. | ........ | A01M 31/002 |
| | | | | 348/155 |

FOREIGN PATENT DOCUMENTS

| | | | | | |
|---|---|---|---|---|---|
| CN | 112179377 A | * | 1/2021 | ............ | G01C 25/00 |
| EP | 3288177 A1 | | 2/2018 | | |
| JP | 2004258250 A | * | 9/2004 | ............... | G03B 5/00 |
| KR | 20150056379 A | | 5/2015 | | |

OTHER PUBLICATIONS

Hansson et al., "PTZ Camera Tampering Correction Using IMUs", Lund University, 91 pages, May 2022.
Obukhov et al., "Fully Automatic PTZ Camera Calibration Method", Moscow University, 7 pages, Jun. 1, 2014.
Wang et al., "Facilitating PTZ Camera Auto-Calibration to be Noise Resilient With Two Images", IEEEAccess, vol. 7, 13 pages, Sep. 28, 2019.

* cited by examiner

SECURITY CAMERA WITH SELF-CALIBRATION OF PAN AND/OR TILT OPERATIONS

TECHNICAL FIELD

The present disclosure relates generally to security camera, and more particularly, to security cameras that are configured for self-calibration of pan and/or tilt operations.

BACKGROUND

A large number of security cameras are commonly used to monitor a variety of secured areas. Some security cameras are configured to include one or more motors and drive trains that allow a camera lens within the security camera to change its Field of View (FOV). Some such security cameras include Pan Tilt Zoom (PTZ) cameras. PTZ cameras may include a motor that can drive the camera lens to Pan, or move left and right in order to change the FOV of the camera lens. PTZ cameras may include a motor that can drive the camera lens to Tilt, or move up and down in order to change the FOV of the camera lens. PTZ cameras may include a camera lens that is configured to Zoom, or zoom in or zoom out to change what is included in the FOV of the camera lens. The zoom can be a digital zoom and/or an optical zoom. For an optical zoom, the PTZ camera may include a motor that can drive the camera lens toward and away from an image capture sensor of the PTZ camera.

Over time, the motors and/or drive train that drives a PTZ camera to Pan and/or Tilt may develop inefficiencies, and may not work as well as when they were new. For example, wear and tear of the motor and/or drive train can affect the speed at which the motors and/or drive train can move the PTZ camera during a pan and/or tilt operation. As a result, driving one or more of the motors for a commanded period of time may not achieve a desired change in the pan and/or tilt angle of the PTZ camera. For example, when wear and tear of the motor and/or drive train reduces the speed at which the motor and/or drive train move the PTZ camera, a 90 degree pan command that activates a pan motor for a period of time that was originally calibrated to produce a pan of 90 degrees may now only produce a pan of 87 degrees. What would be desirable is a security camera that can self-calibrate in order to compensate for wear and tear and/or other factors that can affect the performance and/or accuracy of pan and/or tilt operations over time.

SUMMARY

This disclosure relates generally to security camera, and more particularly, to security cameras that are configured for self-calibration of pan and/or tilt operations. An example may be found in a security camera. The illustrative security camera includes an image capture sensor for capturing an image of a scene and one or more motors for moving the image capture sensor to achieve a pan and/or tilt operation of the image capture sensor. The security camera further includes a gyroscope sensor for sensing angular speed of the image capture sensor, a memory for storing calibration data generated during a first time period (e.g. original calibration) that includes an indication of the angular speed of the image capture sensor sensed by the gyroscope sensor while performing a pan and/or tilt operation of the image capture sensor and a controller operatively coupled to the one or more motors, the gyroscope sensor and the memory. The controller is configured to compare the angular speed of the image capture sensor sensed by the gyroscope sensor while performing a pan and/or tilt operation of the image capture sensor during a second time period that is later than the first time period with the indication of the angular speed of the image capture sensor sensed by the gyroscope sensor while performing a pan and/or tilt operation of the image capture sensor during the first time period (e.g. original calibration) and to identify a drift in the angular speed of the image capture sensor while performing a pan and/or tilt operation of the image capture sensor over time. The controller is configured to compensate for the drift during subsequent pan and/or tilt operations of the image capture sensor.

Another example may be found in a method. The illustrative method includes storing calibration data generated during a calibration period (e.g. original calibration) that includes an indication of an angular speed of an image capture sensor sensed by a gyroscope sensor while performing a calibration pan and/or tilt operation of the image capture sensor. An angular speed of the image capture sensor sensed by the gyroscope sensor while performing a pan and/or tilt operation of the image capture sensor during an operational period later than the calibration period (e.g. later than the original calibration) is compared with the indication of the angular speed of the image capture sensor sensed by the gyroscope sensor while performing the pan and/or tilt operation of the image capture sensor during the calibration period. The method includes identifying a drift in the angular speed of the image capture sensor while performing a pan and/or tilt operation of the image capture sensor over time and compensating for the drift during subsequent pan and/or tilt operations of the image capture sensor.

Another example may be found in a non-transitory computer readable medium storing instructions thereon that when executed by one or more processors causes the one or more processors to retrieve calibration data generated during a calibration period (e.g. original calibration) that includes an indication of an angular speed of an image capture sensor sensed by a gyroscope sensor while performing a pan and/or tilt operation of the image capture sensor during the calibration period. The one or more processors are caused to receive an angular speed of the image capture sensor sensed by the gyroscope sensor while performing a pan and/or tilt operation of the image capture sensor during an operational period later than the calibration period (e.g. later than the original calibration). The one or more processors are caused to compare the angular speed of the image capture sensor sensed by the gyroscope sensor while performing the pan and/or tilt operation of the image capture sensor during the operational period with the indication of the angular speed of the image capture sensor sensed by the gyroscope sensor during the calibration period. The one or more processors are caused to identify a drift in the angular speed of the image capture sensor over time and to compensate for the drift during subsequent pan and/or tilt operations of the image capture sensor.

The preceding summary is provided to facilitate an understanding of some of the features of the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following description of various illustrative embodiments of the disclosure in connection with the accompanying drawings, in which.

While the disclosure is amenable to various modifications and alternative forms, specifics thereof have been shown by way of example in the drawings and will be described in detail. It should be understood, however, that the intention is not to limit aspects of the disclosure to the particular illustrative embodiments described. On the contrary, the intention is to cover all modifications, equivalents, and alternatives falling within the spirit and scope of the disclosure.

DESCRIPTION

The following description should be read with reference to the drawings wherein like reference numerals indicate like elements. The drawings, which are not necessarily to scale, are not intended to limit the scope of the disclosure. In some of the figures, elements not believed necessary to an understanding of relationships among illustrated components may have been omitted for clarity.

All numbers are herein assumed to be modified by the term "about", unless the content clearly dictates otherwise. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic may be applied to other embodiments whether or not explicitly described unless clearly stated to the contrary.

Figure 1:
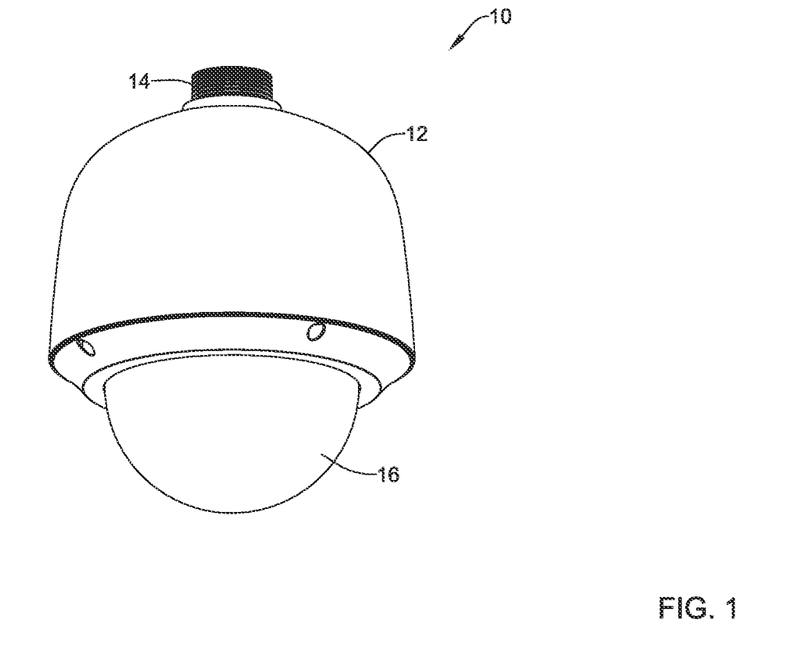
FIG. 1 is a perspective view of an illustrative Pan Tilt Zoom (PTZ) camera enclosure.

FIG. 1 is a perspective view of an illustrative Pan Tilt Zoom (PTZ) camera 10. The illustrative PTZ camera 10 includes a housing 12 that may include a mounting feature 14. While a threaded mounting feature 14 is shown, this is merely illustrative, as the housing 12 may be configured to be mounted in position, such as to a mounting bracket, in any of a variety of different ways. The PTZ camera 10 includes a globe 16 that extends downward (in the illustrated orientation) beyond the housing 12. In some instances, the globe 16 may be formed of a transparent or at least a substantially transparent material so that a camera lens disposed within the globe 16 is able to view scenery and events that are outside of the PTZ camera 10. The globe 16 may help protect the camera components inside of the housing 12 and globe 16 from the external environment and tampering.

Figure 2:
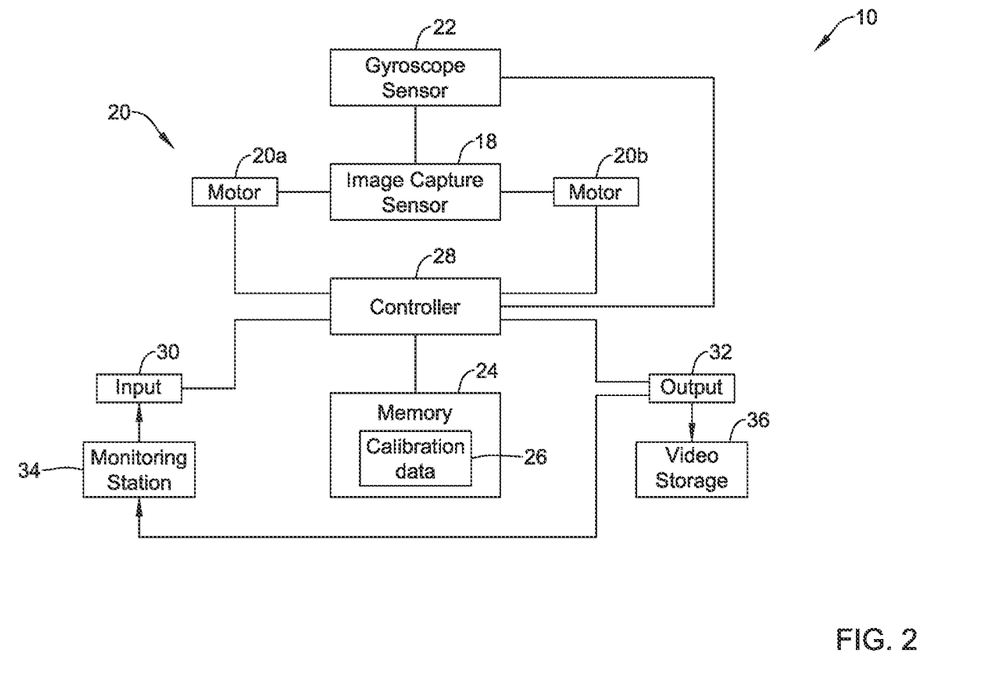
FIG. 2 is a schematic block diagram showing components within the PTZ camera enclosure.

FIG. 2 is a schematic block diagram of the illustrative PTZ camera 10, showing some of the components that are disposed within the housing 12. The illustrative PTZ camera 10 includes an image capture sensor 18 that is configured to capture an image of a scene. In some instances, the image capture sensor 18 includes a charge-coupled device (CCD), an active-pixel device (CMOS sensor) and/or any other suitable image capture device. In some cases, the image capture sensor may include a night vision camera, such as a Forward Looking Infrared (FLiR) sensor, a microbolometer or any other suitable night vision or infrared camera. In some instances, the image capture sensor 18 may include a camera lens adjacent to the image capture device. In some cases, the image capture sensor 18 may include a zoom motor that can drive the camera lens (sometimes through a zoom drive train) toward and away from the image capture device to achieve a desired zoom level.

The illustrative PTZ camera 10 includes one or more motors 20, individually labeled as 20a and 20b, which are configured to move the image capture sensor 18 in order to achieve a pan operation and/or a tilt operation of the image capture sensor 18. As an example, the motor 20a may be configured to cause the image capture sensor 18 to pan, or move left and right, and the motor 20b may be configured to cause the image capture sensor 18 to tilt, or move up and down. While not shown, the PTZ camera 10 may include a first drivetrain that operably connects the motor 20a with the image capture sensor 18 and a second drivetrain that operably connects the motor 20b with the image capture sensor 18. While two motors 20 are shown, in some instances the PTZ camera 10 may only include one motor. In some cases, the PTZ camera 10 may include gearing that allows a single motor 20 to both pan and tilt the image capture sensor 18. In some cases, the PTZ camera 10 may include more than two motors.

A gyroscope sensor 22 is operably coupled with the image capture sensor 18 such that the gyroscope sensor 22 is able to sense an angular speed of the image capture sensor 18 when the image capture sensor 18 is being moved by the motor(s) 20. In some cases, the gyroscope sensor 22 may be mounted to move with the image capture sensor 18. In some instances, the gyroscope sensor 22 may be a three-axis gyroscope sensor. In some cases, the gyroscope sensor 22 may be a microelectromechanical systems (MEMS) gyroscope, a hemispherical resonator gyroscope (HRG), a vibrating structure gyroscope (VSG), a dynamically tuned gyroscope (DTG), a ring laser gyroscope, a fiber optic gyroscope, a London moment gyroscope, or any other suitable gyroscope. In some instances, the gyroscope sensor 22 may be combined with a three-axis accelerometer for even more robust direction- and motion-sensing. In some cases, the gyroscope sensor 22 may be replaced with a three-axis accelerometer.

A memory 24 is configured to store calibration data 26 that is generated during a first time period, such as during an original calibration of the PTZ camera 10. The calibration data 26 includes an indication of the angular speed of the image capture sensor 18 sensed by the gyroscope sensor 22 while performing a pan and/or tilt operation of the image capture sensor 18 observed during the first time period. In some instances, the calibration data 26 may include an indication of the angular speed of the image capture sensor 18 sensed by the gyroscope sensor 22 while performing each of a pan and a tilt operation of the image capture sensor 18. In some instances, the calibration data 26 may include an indication of the angular speed of the image capture sensor 18 sensed by the gyroscope sensor 22 for each of a plurality of pan and/or tilt operations of the image capture sensor 18 while driven by the one or more motors 20 at different angular speeds.

A controller 28 is operably coupled to the one or more motors 20, the gyroscope sensor 22 and the memory 24. In some instances, the controller 28 may be operably coupled with an input 30 and with an output 32. The input 30 and the output 32 may each represent connection ports by which information flows to and from the controller 28, respectively. Information may be received by the input 30 and may flow to the controller 28. The controller 28 may output information that flows to the output 32. In some instances, the input 30 and the output 32 may be implemented using a common communication pathway, sometimes using an Input/Output (I/O) communication protocol such as the Ethernet protocol or any other suitable protocol. It is contemplated that the common communication pathway may be a wired communication pathway or a wireless communication pathway.

In some instances, the input 30 may be operably coupled with a monitoring station 34 that may provide instructions to the PTZ camera 10, instructing the PTZ camera 10 to change one or more of its pan, its tilt or its zoom in order to better capture a possible event. The monitoring station 34 may be remote from a location of the PTZ camera 10, for example, and may oversee the operation of a large number of security cameras such as the PTZ camera 10.

The output 32 may be operably coupled with the monitoring station 34 and/or a video storage 36. The video storage 36 may be configured to store videos and/or still images captured by the PTZ camera 10. The video storage 36 may be remote from a location of the PTZ camera 10 and may be configured to store videos and/or still images captured by a large number of different security cameras including the PTZ camera 10. The video storage 36 may include one or more Digital Video Recorder (DVR)s, for example. The video storage 36 may be operatively coupled to the monitoring station 34, and in some cases part of the monitoring station 34.

The controller 28 is configured to compare the angular speed of the image capture sensor 18 sensed by the gyroscope sensor 22 while performing a pan and/or tilt operation of the image capture sensor 18 during a second time period that is later than the first time period (e.g. after an original calibration of the PTZ camera 10) with the indication of the angular speed of the image capture sensor 18 sensed by the gyroscope sensor 22 while performing a pan and/or tilt operation of the image capture sensor during the first time period (e.g. during an original calibration of the PTZ camera 10). In some instances, the first time period may correspond to a time period before the PTZ camera 10 is deployed in the field (e.g. during an original calibration of the PTZ camera 10). In some instances, the second time period may correspond to a time period after the PTZ camera 10 is deployed in the field.

The controller 28 is configured to identify a drift in the angular speed of the image capture sensor while performing a pan and/or tilt operation of the image capture sensor over time. The controller 28 is configured to compensate for the drift during subsequent pan and/or tilt operations of the image capture sensor. In some instances, the controller 28 may be configured to identify an angular speed that the one or more motors 20 are intended to be driving the image capture sensor 18 during a particular pan and/or tilt operation, and compare the angular speed of the image capture sensor 18 sensed by the gyroscope sensor 22 while performing the particular pan and/or tilt operation of the image capture sensor 18 during the second time period with the indication of the angular speed of the image capture sensor 18 sensed by the gyroscope sensor 22 during the first time period when being driven by the one or more motors 20 at the identified angular speed.

In some instances, the controller 28 may be configured to repeatedly compare the angular speed of the image capture sensor 18 sensed by the gyroscope sensor 22 while performing a pan and/or tilt operation of the image capture sensor 18 during a corresponding time period later than the first time period with the indication of the angular speed of the image capture sensor 18 sensed by the gyroscope sensor 22 during the first time period. The controller 28 may be configured to repeatedly identify a drift in the angular speed of the image capture sensor 18 of the image capture sensor 18 while performing pan and/or tilt operations of the image capture sensor 18 over time.

Figure 3:
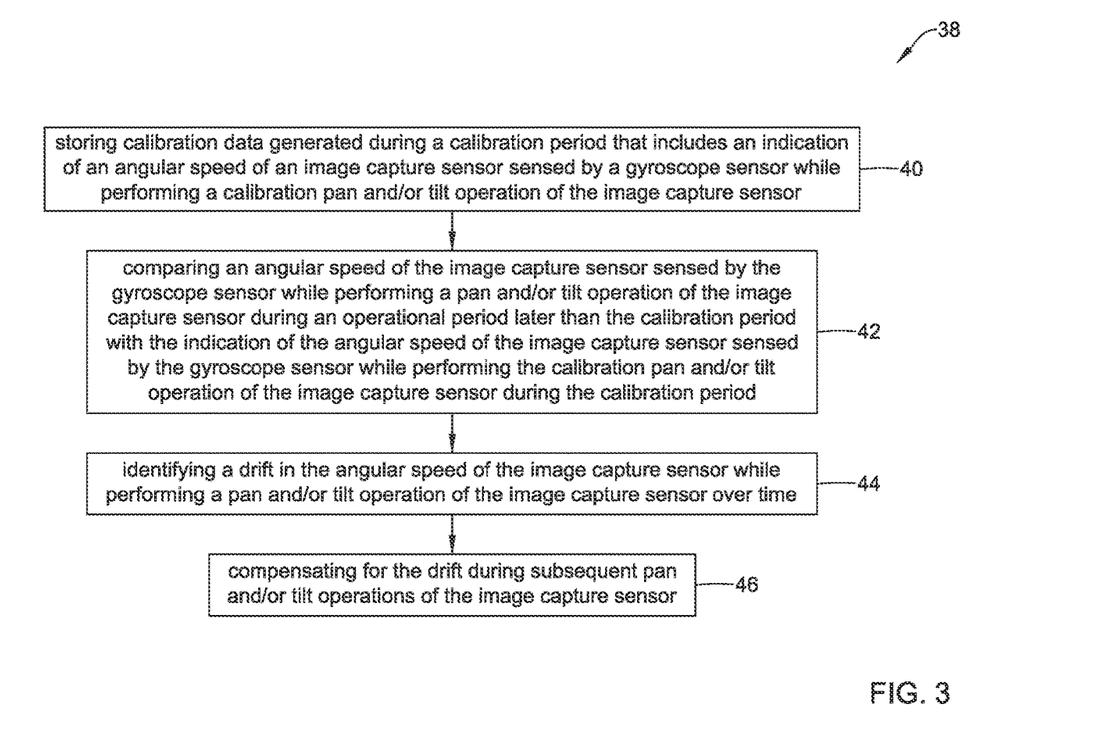
FIG. 3 is a flow diagram showing an illustrative method.

FIG. 3 is a flow diagram showing an illustrative method 38. The method 38 includes storing calibration data generated during a calibration period that includes an indication of an angular speed of an image capture sensor (such as the image capture sensor 18) sensed by a gyroscope sensor (such as the gyroscope sensor 22) while performing a calibration pan and/or tilt operation of the image capture sensor, as indicated at block 40. An angular speed of the image capture sensor sensed by the gyroscope sensor while performing a pan and/or tilt operation of the image capture sensor during an operational period later than the calibration period is compared with the indication of the angular speed of the image capture sensor sensed by the gyroscope sensor while performing the calibration pan and/or tilt operation of the image capture sensor during the calibration period, as indicated at block 42. A drift in the angular speed of the image capture sensor is identified while performing a pan and/or tilt operation of the image capture sensor over time, as indicated at block 44. The drift represents a difference between the angular speed of the image capture sensor sensed by the gyroscope sensor while performing a pan and/or tilt operation of the image capture sensor during the operational period and the angular speed of the image capture sensor sensed by the gyroscope sensor while performing the calibration pan and/or tilt operation of the image capture sensor during the calibration period. The drift is compensated for during subsequent pan and/or tilt operations of the image capture sensor, as indicated at block 46. In some instances, the calibration period may correspond to a time period before the image capture sensor is deployed in the field and the operational period may correspond to a time period after the image capture sensor has been deployed in the field, but this is not required.

Figure 4A:
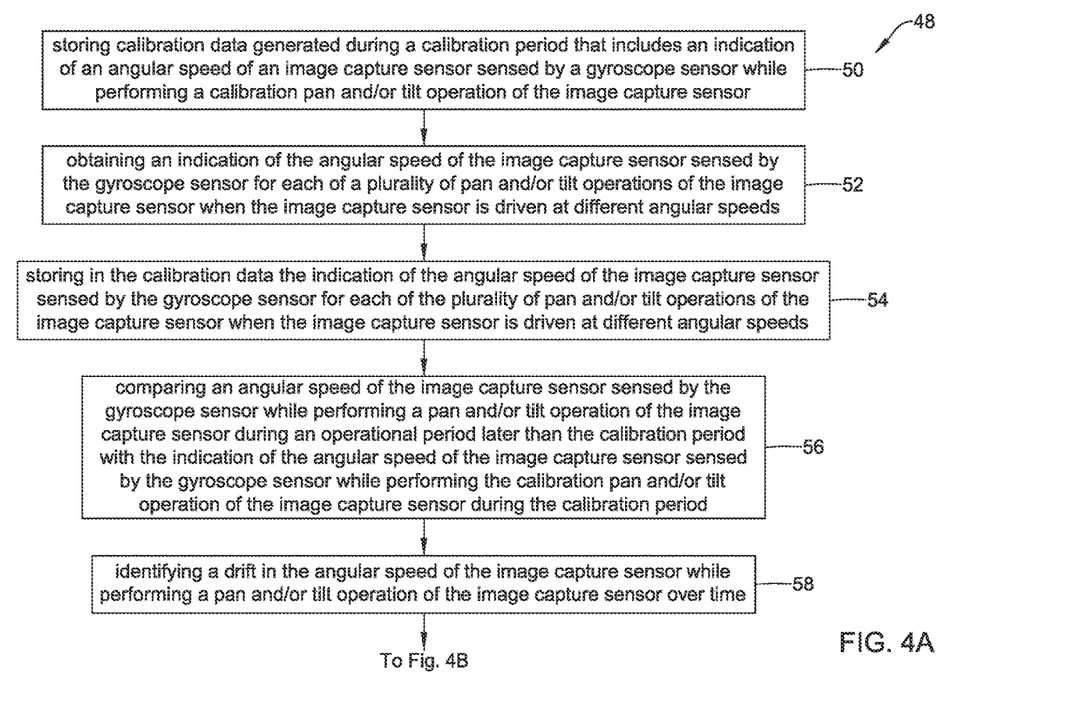
FIGS. 4A and 4B collectively provide a flow diagram showing an illustrative method.
Figure 4B:
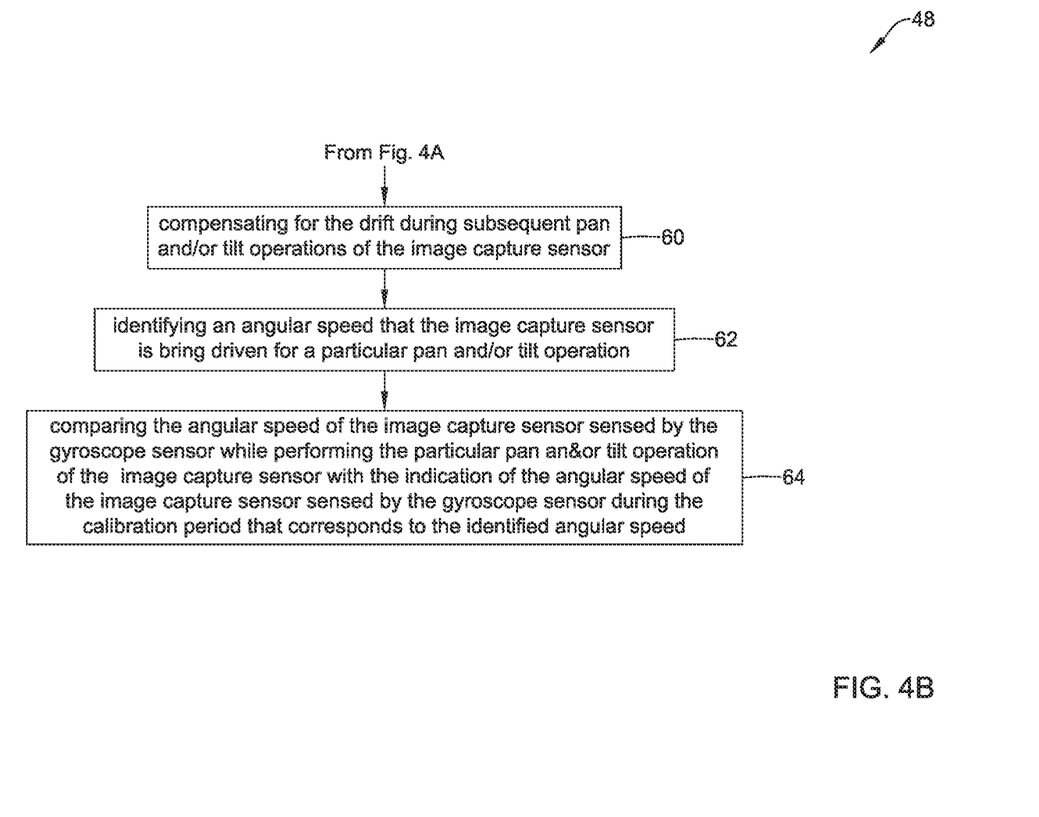

FIGS. 4A and 4B collectively provide a flow diagram showing an illustrative method 48. The method 48 includes storing calibration data generated during a calibration period that includes an indication of an angular speed of an image capture sensor (such as the image capture sensor 18) sensed by a gyroscope sensor (such as the gyroscope sensor 22) while performing a calibration pan and/or tilt operation of the image capture sensor, as indicated at block 50. An indication of the angular speed of the image capture sensor sensed by the gyroscope sensor is obtained for each of a plurality of pan and/or tilt operations of the image capture sensor when the image capture sensor is driven at different angular speeds, as indicated at block 52. The indication of the angular speed of the image capture sensor sensed by the gyroscope sensor for each of the plurality of pan and/or tilt operations of the image capture sensor when the image capture sensor is driven at different angular speeds is stored in the calibration data, as indicated at block 54.

An angular speed of the image capture sensor sensed by the gyroscope sensor while performing a pan and/or tilt operation of the image capture sensor during an operational period later than the calibration period is compared with the indication of the angular speed of the image capture sensor sensed by the gyroscope sensor while performing the calibration pan and/or tilt operation of the image capture sensor during the calibration period, as indicated at block 56. A drift in the angular speed of the image capture sensor is identified while performing a pan and/or tilt operation of the image capture sensor over time, as indicated at block 58.

The method 48 continues on FIG. 4B, where the drift is compensated for during subsequent pan and/or tilt operations of the image capture sensor, as indicated at block 60. In some instances, the calibration period may correspond to a time period before the image capture sensor is deployed in the field and the operational period may correspond to a time period after the image capture sensor has been deployed in the field.

In some instances, the method 48 further includes identifying an angular speed that the image capture sensor is being driven for a particular pan and/or tilt operation, as indicated at block 62. The angular speed of the image capture sensor sensed by the gyroscope sensor while performing the particular pan and/or tilt operation of the image capture sensor is compared with the indication of the angular speed of the image capture sensor sensed by the gyroscope sensor during the calibration period that corresponds to the identified angular speed, as indicated at block 64.

Figure 5:
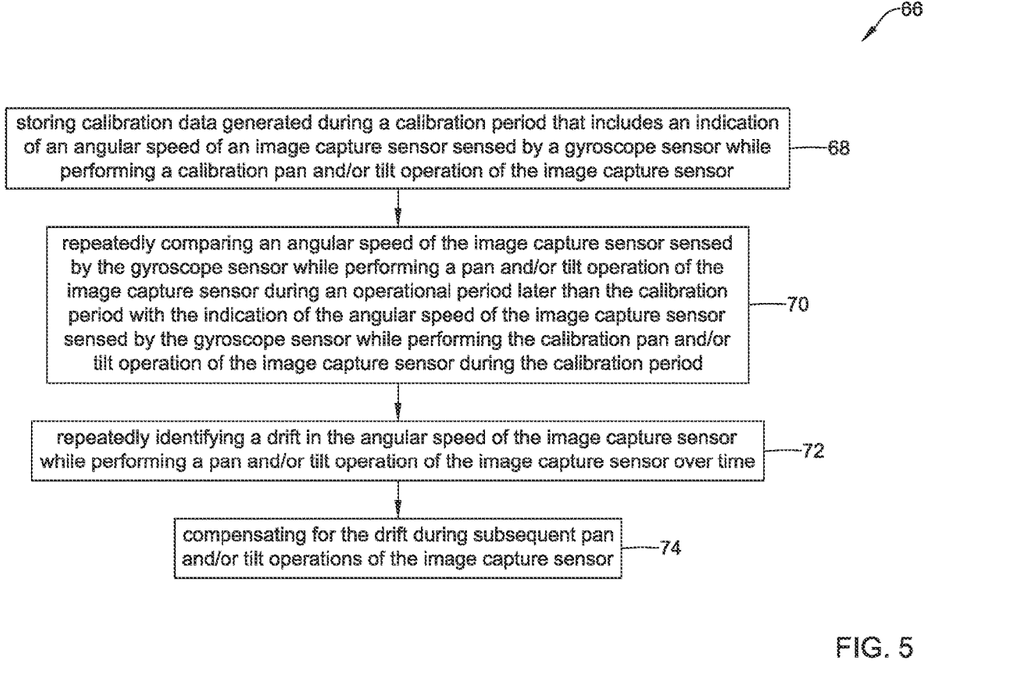
FIG. 5 is a flow diagram showing an illustrative method.

FIG. 5 is a flow diagram showing an illustrative method 66. The method 66 includes storing calibration data generated during a calibration period that includes an indication of an angular speed of an image capture sensor (such as the image capture sensor 18) sensed by a gyroscope sensor (such as the gyroscope sensor 22) while performing a calibration pan and/or tilt operation of the image capture sensor, as indicated at block 68. An angular speed of the image capture sensor sensed by the gyroscope sensor while performing a pan and/or tilt operation of the image capture sensor during an operational period later than the calibration period is repeatedly compared with the indication of the angular speed of the image capture sensor sensed by the gyroscope sensor while performing the calibration pan and/or tilt operation of the image capture sensor during the calibration period, as indicated at block 70. A drift in the angular speed of the image capture sensor is repeatedly identified while performing pan and/or tilt operations of the image capture sensor over time, as indicated at block 72. The drift is compensated for during subsequent pan and/or tilt operations of the image capture sensor, as indicated at block 74. In some instances, the calibration period may correspond to a time period before the image capture sensor is deployed in the field and the operational period may correspond to a time period after the image capture sensor has been deployed in the field.

Figure 6:
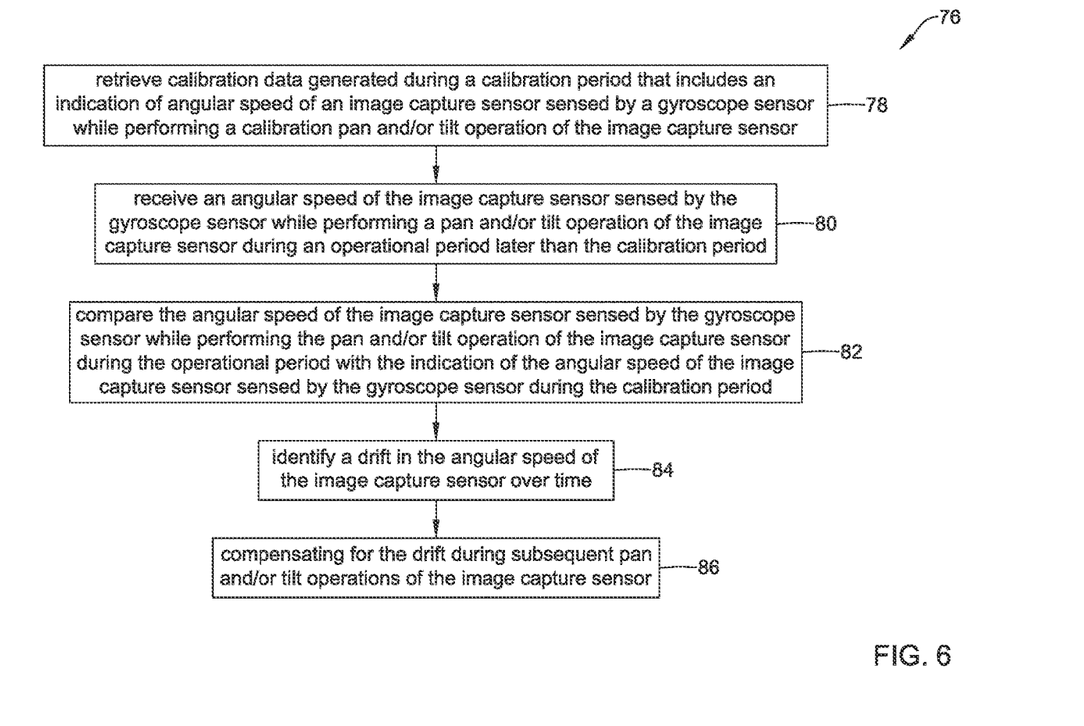
FIG. 6 is a flow diagram showing an illustrative series of steps that may be carried out via one or more processors executing instructions.

FIG. 6 is a flow diagram showing an illustrative series of steps 76 that may be carried out by one or more processors when the one or more processors execute instructions stored on a non-transitory, computer-readable storage medium. The one or more processors may be part of the controller 28, for example. The one or more processors may be caused to retrieve calibration data generated during a calibration period that includes an indication of an angular speed of an image capture sensor sensed by a gyroscope sensor while performing a calibration pan and/or tilt operation of the image capture sensor, as indicated at block 78. The one or more processors may be caused to receive an angular speed of the image capture sensor sensed by the gyroscope sensor while performing a pan and/or tilt operation of the image capture sensor during an operational period later than the calibration period, as indicated at block 80.

The one or more processors may be caused to compare the angular speed of the image capture sensor sensed by the gyroscope sensor while performing the pan and/or tilt operation of the image capture sensor during the operational period with the indication of the angular speed of the image capture sensor sensed by the gyroscope sensor during the calibration period, as indicated at block 82. The one or more processors may be caused to identify a drift in the angular speed of the image capture sensor over time, as indicated at block 84. The one or more processors may be caused to compensate for the drift during subsequent pan and/or tilt operations of the image capture sensor, as indicated at block 86. The calibration period may correspond to a time period before the image capture sensor is deployed in the field and the operational period may correspond to a time period after the image capture sensor is deployed in the field.

Figure 7:
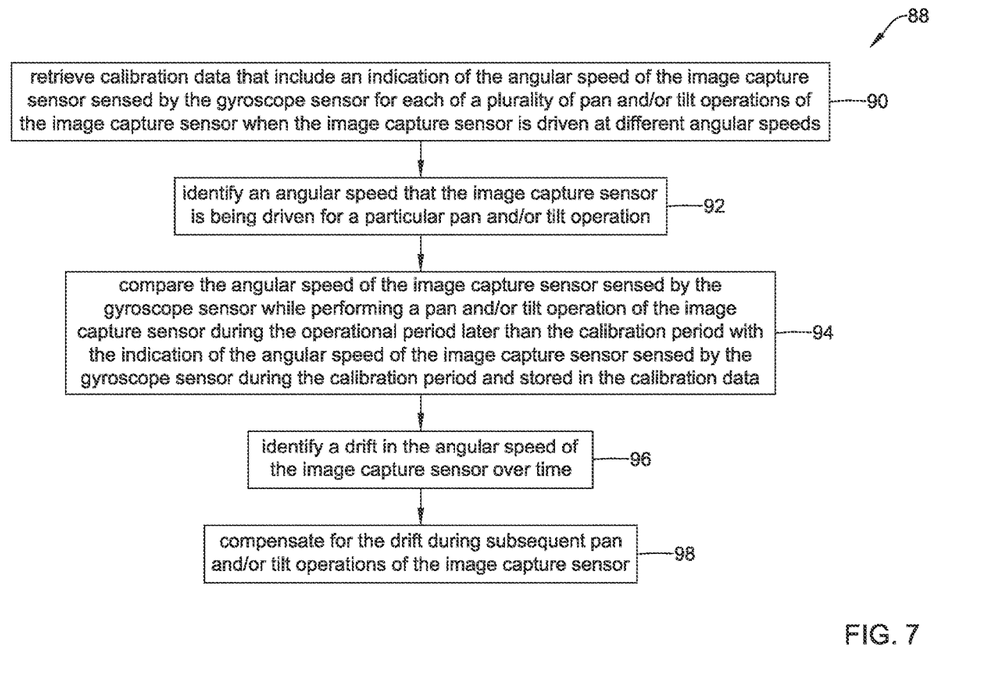
FIG. 7 is a flow diagram showing an illustrative series of steps that may be carried out via one or more processors executing instructions.

FIG. 7 is a flow diagram showing an illustrative series of steps 88 that may be carried out by one or more processors when the one or more processors execute instructions stored on a non-transitory, computer-readable storage medium. The one or more processors may be part of the controller 28, for example. The one or more processors may be caused to retrieve calibration data that include an indication of the angular speed of the image capture sensor sensed by the gyroscope sensor for each of a plurality of pan and/or tilt operations of the image capture sensor when the image capture sensor is driven at different angular speeds, as indicated at block 90.

The one or more processors may be caused to identify an angular speed that the image capture sensor is being driven for a particular pan and/or tilt operation, as indicated at block 92. The one or more processors may be caused to compare the angular speed of the image capture sensor sensed by the gyroscope sensor while performing the particular pan and/or tilt operation of the image capture sensor with the indication of the angular speed of the image capture sensor sensed by the gyroscope sensor during the calibration period that corresponds to the identified angular speed, as indicated at block 94.

The one or more processors may be caused to identify a drift in the angular speed of the image capture sensor over time, as indicated at block 8964. The one or more processors may be caused to compensate for the drift during subsequent pan and/or tilt operations of the image capture sensor, as indicated at block 98. The calibration period may correspond to a time period before the image capture sensor is deployed in the field and the operational period may correspond to a time period after the image capture sensor is deployed in the field.

Figure 8:
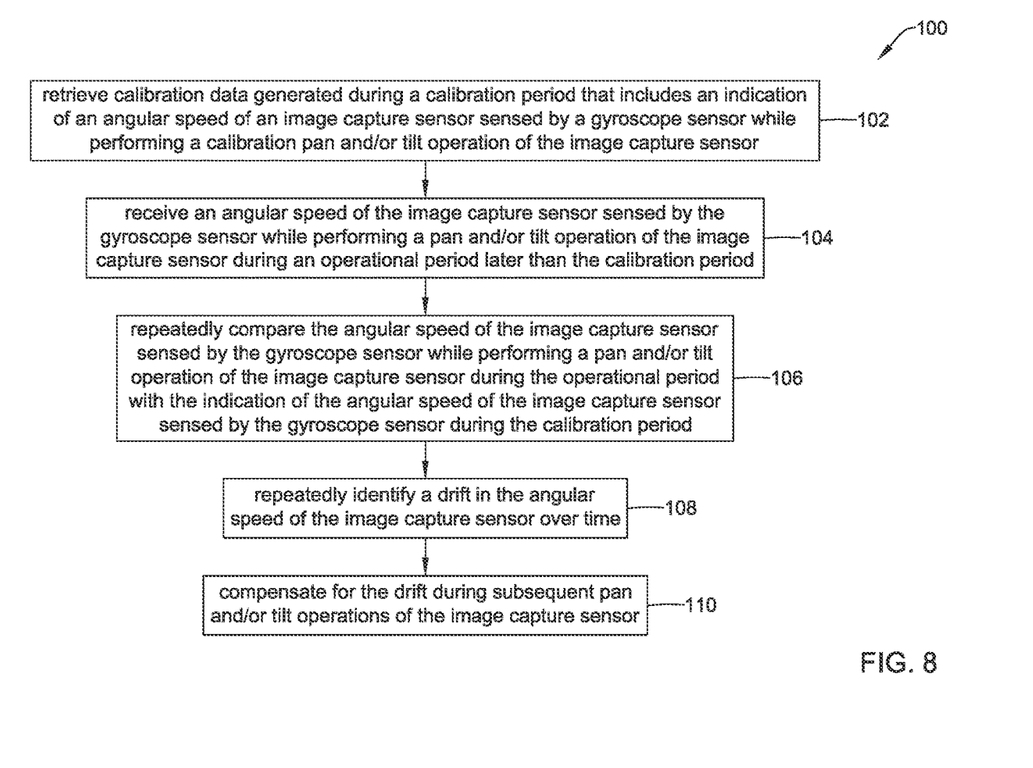
FIG. 8 is a flow diagram showing an illustrative series of steps that may be carried out via one or more processors executing instructions.

FIG. 8 is a flow diagram showing an illustrative series of steps 100 that may be carried out by one or more processors when the one or more processors execute instructions stored on a non-transitory computer-readable storage medium. The one or more processors may be part of the controller 28, for example. The one or more processors may be caused to retrieve calibration data generated during a calibration period that includes an indication of an angular speed of an image capture sensor sensed by a gyroscope sensor while performing a calibration pan and/or tilt operation of the image capture sensor, as indicated at block 102. The one or more processors may be caused to receive an angular speed of the image capture sensor sensed by the gyroscope sensor while performing a pan and/or tilt operation of the image capture sensor during an operational period later than the calibration period, as indicated at block 104.

The one or more processors may be caused to repeatedly compare the angular speed of the image capture sensor sensed by the gyroscope sensor while performing the pan and/or tilt operation of the image capture sensor during the operational period with the indication of the angular speed of the image capture sensor sensed by the gyroscope sensor during the calibration period, as indicated at block 106. The one or more processors may be caused to repeatedly identify a drift in the angular speed of the image capture sensor over time, as indicated at block 108. The one or more processors may be caused to compensate for the drift during subsequent pan and/or tilt operations of the image capture sensor, as indicated at block 110. The calibration period may correspond to a time period before the image capture sensor is deployed in the field and the operational period may correspond to a time period after the image capture sensor is deployed in the field.

Figure 9:
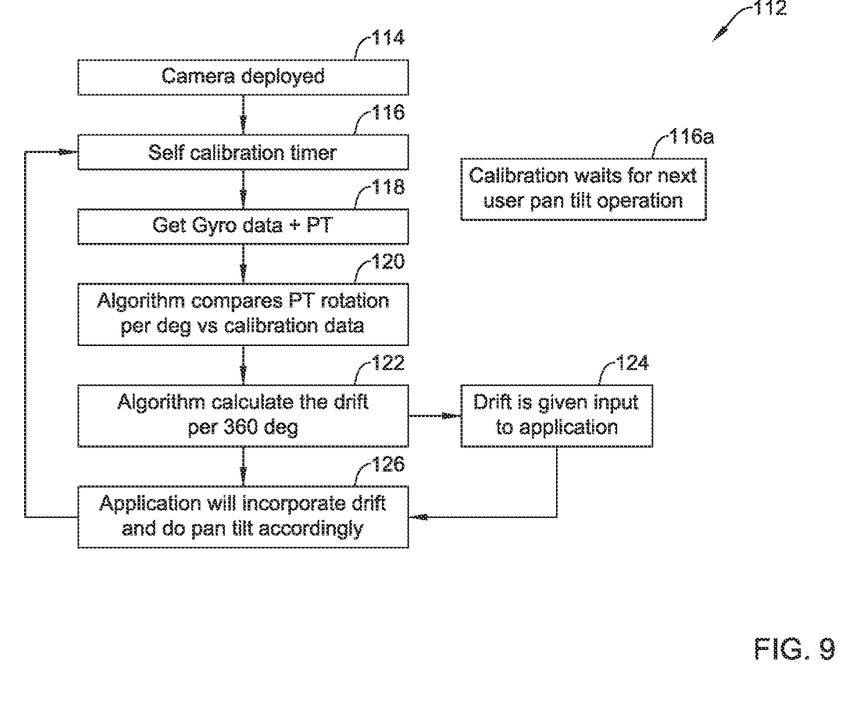
FIG. 9 is a flow diagram showing an illustrative method.

FIG. 9 is a flow diagram showing an illustrative method 112 that may occur after a security camera has been deployed in the field. It will be appreciated that prior to deployment, the security camera may undergo a factory calibration in which the pan and tilt features of the security camera are triggered and the corresponding gyroscope sensor data is recorded as calibration data and the calibration data is stored within the security camera before deployment of the security camera.

The method 112 includes deploying the calibrated camera, as indicated at block 114. In some instances, the camera may include a self-calibration timer, as indicated at block 116. When the timer expires, calibration awaits a next user-driven pan/tilt operation, as indicated at block 116a. Gyroscope data along with the pan/tilt instruction of the user-driven pan/tilt operation are obtained for the next user-driven pan/tilt operation, as indicated at block 118. The gyroscope data collected during the user-driven pan/tilt operation may indicate an angular velocity (in degrees/second) achieved during the user-driven pan/tilt operation. This angular velocity is then compared to the expected angular velocity (in degrees/second) for the user-driven pan/tilt operation expressed in the calibration data, as indicated in block 120. From this, a drift (in degrees) that correspond to a 360 degree pan or tilt operation is calculated, as indicated at 122. In some cases, the angular velocity (in degrees/second) achieved during the user-driven pan/tilt operation is subtracted from the expected angular velocity (in degrees/second) for the user-driven pan/tilt operation expressed in the calibration data, resulting in a delta angular velocity (in degrees/second). This quantity (in degrees/seconds) is then multiplied by the time (in seconds) it would take to complete a 360 degree pan or tilt operation as expressed in the calibration data, to result in the drift (in degrees) that correspond to 360 degrees of travel of the pan or tilt operation. The drift is given as an input to the controller, as indicated at block 124. The controller may compensate subsequent pan/tilt operation according to the drift, as indicated at 126. For example, if the current drift is found to be 4 degrees per 360 degrees of travel for a pan operation, and a subsequent user-driven pan operation is for a 90 degree pan operation, the controller may identify a drift of 1 degree (4 degrees*90 degrees/360 degrees) for the 90 degree pan operation, and may adjusts the pan instruction for the camera to a 91 degree pan instruction (90 degree pan operation+1 degree drift) for the 90 degree pan operation.

Those skilled in the art will recognize that the present disclosure may be manifested in a variety of forms other than the specific embodiments described and contemplated herein. Accordingly, departure in form and detail may be made without departing from the scope and spirit of the present disclosure as described in the appended claims.

What is claimed:

1. A security camera comprising:
   an image capture sensor for capturing an image of a scene;
   one or more motors for moving the image capture sensor to achieve a pan and/or tilt operation of the image capture sensor;
   a gyroscope sensor for sensing angular speed of the image capture sensor;
   a memory for storing calibration data generated during a first time period that includes an indication of the angular speed of the image capture sensor sensed by the gyroscope sensor while performing each of a plurality of pan and/or tilt operation of the image capture sensor when the image capture sensor is driven at different angular speeds;
   a controller operatively coupled to the one or more motors, the gyroscope sensor and the memory, the controller configured to:
      performing a particular pan and/or tilt operation of the image capture sensor during a second time period that is later than the first time period;
      for the particular pan and/or tilt operation, identify a driven angular speed that the one or more motors are driving the image capture sensor during the particular pan and/or tilt operation;
      compare the angular speed of the image capture sensor sensed by the gyroscope sensor while performing the particular pan and/or tilt operation of the image capture sensor during the second time period with the indication of the angular speed of the image capture sensor sensed by the gyroscope sensor while performing a pan and/or tilt operation of the image capture sensor during the first time period when driven by the one or more motors at an angular speed that corresponds to the driven angular speed of the particular pan and/or tilt operation;
      identify a drift in the angular speed of the image capture sensor while performing a pan and/or tilt operation of the image capture sensor over time; and
      compensate for the drift during subsequent pan and/or tilt operations of the image capture sensor.

2. The security camera of claim 1, wherein the gyroscope sensor is mounted to move with the image capture sensor.

3. The security camera of claim 1, wherein the gyroscope sensor is a three-axis gyroscope sensor.

4. The security camera of claim 1, comprising two or more motors for moving the image capture sensor to achieve a pan and a tilt operation of the image capture sensor, and the calibration data includes an indication of the angular speed of the image capture sensor sensed by the gyroscope sensor while performing each of a pan and a tilt operation of the image capture sensor.

5. The security camera of claim 1, wherein the first time period is before the security camera is deployed in the field.

6. The security camera of claim 1, wherein the second time period is after the security camera is deployed in the field.

7. The security camera of claim 1, wherein the controller is configured to repeatedly:
perform subsequent pan and/or tilt operations of the image capture sensor;
for each of the subsequent pan and/or tilt operations:
identify a driven angular speed that the one or more motors are driving the image capture sensor during the corresponding subsequent pan and/or tilt operation;
compare the angular speed of the image capture sensor sensed by the gyroscope sensor while performing the corresponding subsequent pan and/or tilt operation of the image capture sensor with the indication of the angular speed of the image capture sensor sensed by the gyroscope sensor while performing a pan and/or tilt operation of the image capture sensor during the first time period when driven by the one or more motors at an angular speed that corresponds to the driven angular speed of the corresponding subsequent pan and/or tilt operation; and
identify a drift in the angular speed of the image capture sensor while performing a pan and/or tilt operation of the image capture sensor over time.

8. A method comprising:
storing calibration data generated during a calibration period that includes an indication of an angular speed of an image capture sensor sensed by a gyroscope sensor for each of a plurality of calibration pan and/or tilt operations of the image capture sensor when the image capture sensor is driven at different angular speeds;
storing in the calibration data the indication of the angular speed of the image capture sensor sensed by the gyroscope sensor for each of the plurality of calibration pan and/or tilt operations of the image capture sensor when the image capture sensor is driven at different angular speeds;
identifying an angular speed that the image capture sensor is being driven for a particular pan and/or tilt operation;
comparing an angular speed of the image capture sensor sensed by the gyroscope sensor while performing the particular pan and/or tilt operation of the image capture sensor during an operational period later than the calibration period with the indication of the angular speed of the image capture sensor sensed by the gyroscope sensor during the calibration period that corresponds to the identified angular speed;
identifying a drift in the angular speed of the image capture sensor while performing pan and/or tilt operations of the image capture sensor over time including the particular pan and/or tilt operation; and
compensating for the drift during subsequent pan and/or tilt operations of the image capture sensor.

9. The method of claim 8, wherein the calibration period corresponds to a time period before the image capture sensor is deployed in the field.

10. The method of claim 8, wherein the operational period corresponds to a time period after the image capture sensor is deployed in the field.

11. The method of claim 10, comprising repeatedly:
performing subsequent pan and/or tilt operations of the image capture sensor;
for each of the subsequent pan and/or tilt operations:
identifying a driven angular speed of the image capture sensor during the corresponding subsequent pan and/or tilt operation;
comparing the angular speed of the image capture sensor sensed by the gyroscope sensor while performing the corresponding subsequent pan and/or tilt operation of the image capture sensor with the indication of the angular speed of the image capture sensor sensed by the gyroscope sensor while performing a pan and/or tilt operation of the image capture sensor during the calibration period when driven at an angular speed that corresponds to the driven angular speed of the corresponding subsequent pan and/or tilt operation; and
identifying a drift in the angular speed of the image capture sensor over time.

12. A non-transitory computer readable medium storing instructions thereon that when executed by one or more processors causes the one or more processors to:
retrieve calibration data generated during a calibration period that includes an indication of an angular speed of an image capture sensor sensed by a gyroscope sensor for each of a plurality of calibration pan and/or tilt operation of the image capture sensor when the image capture sensor is driven at different angular speeds;
receive an angular speed of the image capture sensor sensed by the gyroscope sensor while performing a particular pan and/or tilt operation of the image capture sensor during an operational period later than the calibration period;
compare the angular speed of the image capture sensor sensed by the gyroscope sensor while performing the particular pan and/or tilt operation of the image capture sensor during the operational period with the indication of the angular speed of the image capture sensor sensed by the gyroscope sensor that corresponds to the angular speed of the image capture sensor sensed by the gyroscope sensor while performing the particular pan and/or tilt operation of the image capture sensor;
identify a drift in the angular speed of the image capture sensor over time; and
compensate for the drift during subsequent pan and/or tilt operations of the image capture sensor.

13. The non-transitory computer readable medium of claim 12, wherein the calibration period corresponds to a time period before the image capture sensor is deployed in the field.

14. The non-transitory computer readable medium of claim 12, wherein the operational period corresponds to a time period after the image capture sensor is deployed in the field.

* * * * *